(12) United States Patent
Zhu

(10) Patent No.: US 11,485,007 B2
(45) Date of Patent: Nov. 1, 2022

(54) HAND-HELD ELECTRICAL POWER TOOL

(71) Applicant: Globe (Jiangsu) Co., Ltd., Jiangsu (CN)

(72) Inventor: Jingcheng Zhu, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 124 days.

(21) Appl. No.: 16/833,017

(22) Filed: Mar. 27, 2020

(65) Prior Publication Data

US 2020/0306949 A1   Oct. 1, 2020

(30) Foreign Application Priority Data

Mar. 27, 2019 (CN) .......................... 201910235254.4

(51) Int. Cl.
| B25F 5/02 | (2006.01) |
| A01D 34/416 | (2006.01) |
| H02K 7/14 | (2006.01) |

(52) U.S. Cl.
CPC .............. *B25F 5/02* (2013.01); *A01D 34/416* (2013.01); *H02K 7/145* (2013.01)

(58) Field of Classification Search
CPC .............................. B25F 5/001; B25B 23/0064
See application file for complete search history.

(56) References Cited

U.S. PATENT DOCUMENTS

| 5,563,482 A * | 10/1996 | Shaw | B23P 19/066 173/176 |
| 8,919,456 B2 * | 12/2014 | Ng | G05B 15/02 173/11 |
| 2004/0159449 A1 * | 8/2004 | Leitenberger | B25F 5/001 173/2 |
| 2012/0074881 A1 * | 3/2012 | Pant | B25F 5/00 318/400.09 |
| 2013/0269961 A1 * | 10/2013 | Lim | B25B 21/00 173/1 |
| 2013/0327552 A1 * | 12/2013 | Lovelass | B25B 23/147 173/1 |
| 2014/0158390 A1 * | 6/2014 | Mashiko | B25B 21/00 173/47 |
| 2014/0284070 A1 * | 9/2014 | Ng | B25F 5/02 173/2 |
| 2014/0367134 A1 * | 12/2014 | Phillips | B25B 21/00 173/176 |
| 2015/0041164 A1 * | 2/2015 | Sergyeyenko | B25B 23/147 173/1 |

(Continued)

*Primary Examiner* — Eyamindae C Jallow
(74) *Attorney, Agent, or Firm* — Rooney IP, LLC

(57) ABSTRACT

A hand-held electrical power tool includes a working device for performing working function of the hand-held electrical power tool, a power device including a motor for driving the working device, a power supplying unit for supplying power to the power device, and an operating device through which a user can operate. The operating device includes an operating handle and a speed regulating device arranged beside the operating handle. The speed regulating device includes a speed regulating switch and a speed regulating operating member connected to the speed regulating switch and driving the speed regulating switch. When the rotating speed of the motor increases from zero to the maximum, the rotating angle of the speed regulating operating member is 0-360 degrees.

10 Claims, 10 Drawing Sheets

(56) References Cited

U.S. PATENT DOCUMENTS

2016/0278288 A1    9/2016  Yamaoka
2016/0302355 A1   10/2016  Martinsson
2018/0311806 A1* 11/2018  Mascall ................. B25F 5/001

* cited by examiner

000
HAND-HELD ELECTRICAL POWER TOOL

CROSS-REFERENCE TO RELATED APPLICATIONS

This application is a US application which claims the priority of CN Application Serial No. 201910235254.4 filed on Mar. 27, 2019, the disclosures of which are hereby incorporated by reference in their entirety.

TECHNICAL FIELD

The invention relates to a hand-held electrical power tool, and more particularly to a garden tool.

BACKGROUND ART

The hand-held power tool includes a working device and a power device that powers the working device. When the power device uses electricity as an energy source, such a hand-held power tool can also be referred to as a hand-held electrical power tool. Conventional hand-held electrical power tool includes a pruning machine, a lawn mower, a pole saw, etc.

The hand-held power tool further includes an operating device. The operating device is provided with a trigger for controlling the operating of the machine and an operating member for controlling the working speed. The conventional operating member for controlling the working speed is disposed on the side of the handle in the form of a fixed gear to control the hand-held power tool working at a correspondingly fixed speed, and therefore, it is not possible to achieve a stepless speed change according to the actual situation.

In view of this, it is indeed necessary to improve the existing hand-held electrical power tool to solve the above problems.

SUMMARY OF INVENTION

It is an object of the present invention to provide a hand-held electrical power tool that not only enables a stepless speed change of the motor, but also obtains a convenient operation.

To achieve the above object, the present invention provides a hand-held electrical power tool, which comprises a working device for performing working function of the hand-held electrical power tool, a power device including a motor for driving the working device, a power supplying unit for powering the power device, and an operating device for a user operating. The operating device comprises an operating handle and a speed regulating device arranged adjacently to the operating handle. The speed regulating device comprises a speed regulating switch and a speed regulating operating member connected with the speed regulating switch to drive the speed regulating switch to operate. When the rotational speed of the motor increases from zero to the maximum, the rotation angle of the speed regulating operating member is 0-360°.

As a further improvement of the present invention, the speed regulating switch is a potentiometer, and the speed regulating operation member is a speed regulating disc cooperating with the potentiometer and the outputting current of the potentiometer is adjusted when the speed regulating disc is rotated.

As a further improvement of the present invention, the speed regulating device further comprises a speed regulating circuit board, and the potentiometer and the motor are respectively connected to the speed regulating circuit board to control the speed of the motor according to the current output of the potentiometer.

As a further improvement of the present invention, the hand-held electrical power tool further comprises a connecting device connecting the working device and the power supplying unit, and the connecting device comprises a connecting rod and an axis of the speed regulating operating member intersects with an axis of the connecting rod.

As a further improvement of the present invention, the axial direction of the connecting rod is defined as a front-to-rear direction, and the speed regulating operating member is located at the left side of the operating handle in the front-to-rear direction.

As a further improvement of the present invention, the axial direction of the connecting rod is defined as a front-to-rear direction, and the speed regulating operating member is located directly above or below the operating handle in the front-to-rear direction.

As a further improvement of the present invention, the speed regulating operating member further drives the speed regulating switch to activate the power device and the working device.

As a further improvement of the present invention, the operating device further comprises a starting device and the starting device comprises a main control switch, a main control operating member for starting the main control switch, and a safety operating member located opposite to the main control operating member, and one end of the main control operating member is disposed adjacently to the safety operating member, and the main control operating member and the safety operating member are engaged with each other in the non-operating state.

As a further improvement of the present invention, the safety operating member and the main control operating member are oppositely disposed on opposite sides of the operating handle, and the main operating member is substantially V-shaped, and the main operating member includes a grip portion and a starting portion, and the starting portion is disposed adjacently to the main control switch to drive the starting portion to rotate and press the main control switch when the grip portion is gripped.

As a further improvement of the present invention, the main control switch is provided in a push-type manner and provided with a telescopic arm to activate the motor when the telescopic arm is pressed, and the larger the pressing stroke of the telescopic arm is, the faster the motor rotates.

The present invention has the beneficial effect that the hand-held electrical power tool has the speed regulating device disposed on the side of the operating handle, thereby facilitating the operator to perform the operation according to the habit and making the operation more convenient. The speed regulating operating member is arranged to adjust the rotation speed of the motor in a rotating manner, so that when the speed regulating operating member is rotated, the speed regulating switch can be driven to realize a stepless speed change of the motor and the operation becomes convenient.

DESCRIPTION OF EMBODIMENTS

In order to make the objective, technical solution, and advantage of the present invention clearer, the following describes the present invention in detail with reference to the accompanying drawings and specific embodiments.

Figure 1:
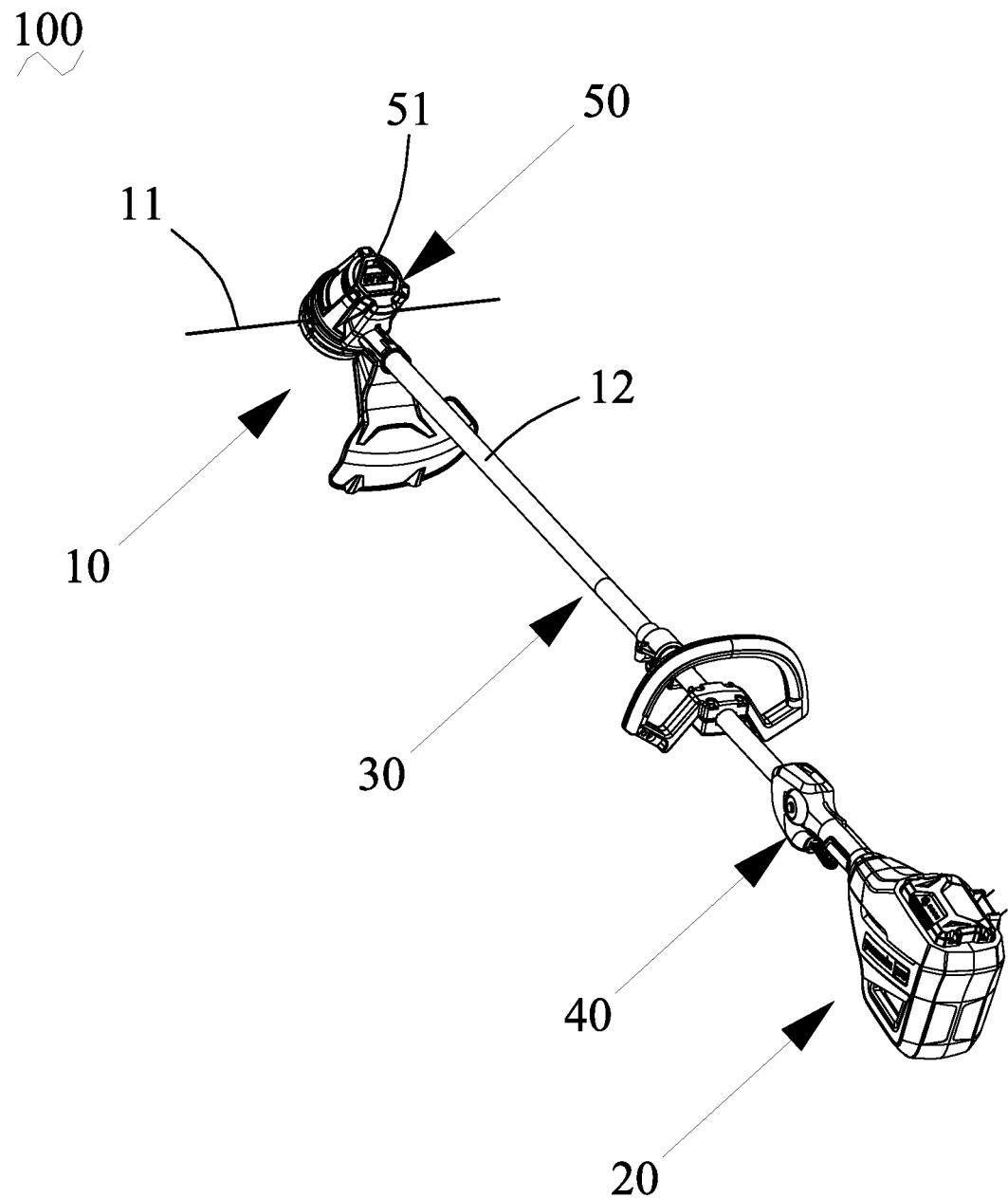
FIG. 1 is a schematic perspective view of a preferred embodiment of a hand-held electrical power tool of the present invention.

As shown in FIG. 1, the present invention discloses a hand-held electrical power tool 100, which comprises a working device 10, a power supplying unit 20, a connecting device 30, an operating device 40 and a power device 50.

The working device 10 is used to perform the actions of the hand-held electrical power tool 100. The working device 10 includes a working element 11 and an extending rod 12 extending outwardly from the working element 11. Specifically, as shown in FIG. 1, the working element 11 is a cutting line or a string, and the hand-held electrical power tool 100 is a string trimmer. Of course, the working element 11 is not limited to the string or the cutting line, and it may also be a saw of a chainsaw that performs a cutting function or a cutting blade of a hedge trimmer that performs a cutting function, which is not limited herein.

The power device 50 is used to drive the working device 10 to operate. The power device 50 includes a motor 51 for driving the rotation of the working member 11 to implement the mowing function. In this embodiment, the power device 50 and the working device 10 are connected to each other and both disposed at the front end of the hand-held electrical power tool 100. The location of the power device 50 and the working device 10 is not limited herein and can be adjusted according to the specific machine, such as a chainsaw, a hedge trimmer.

Figure 2:
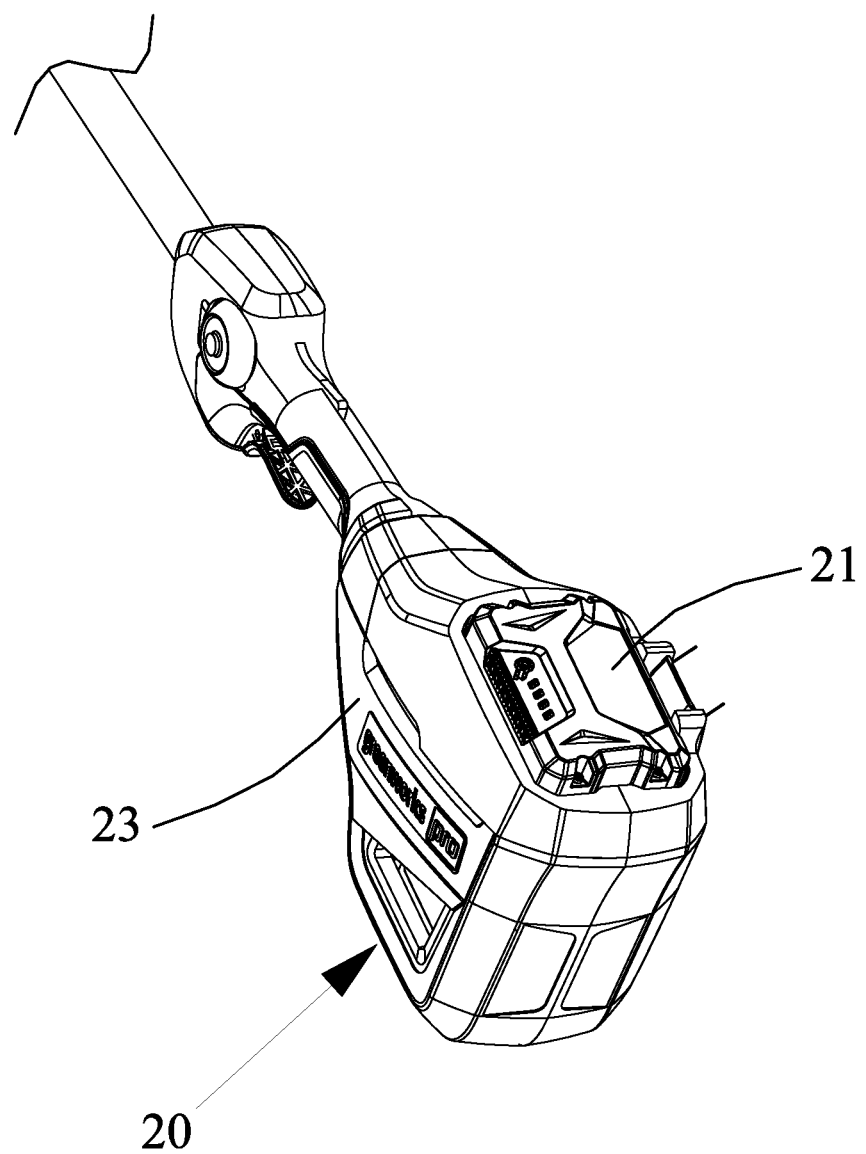
FIG. 2 is a schematic perspective view of the power supplying unit shown in FIG. 1.
Figure 3:
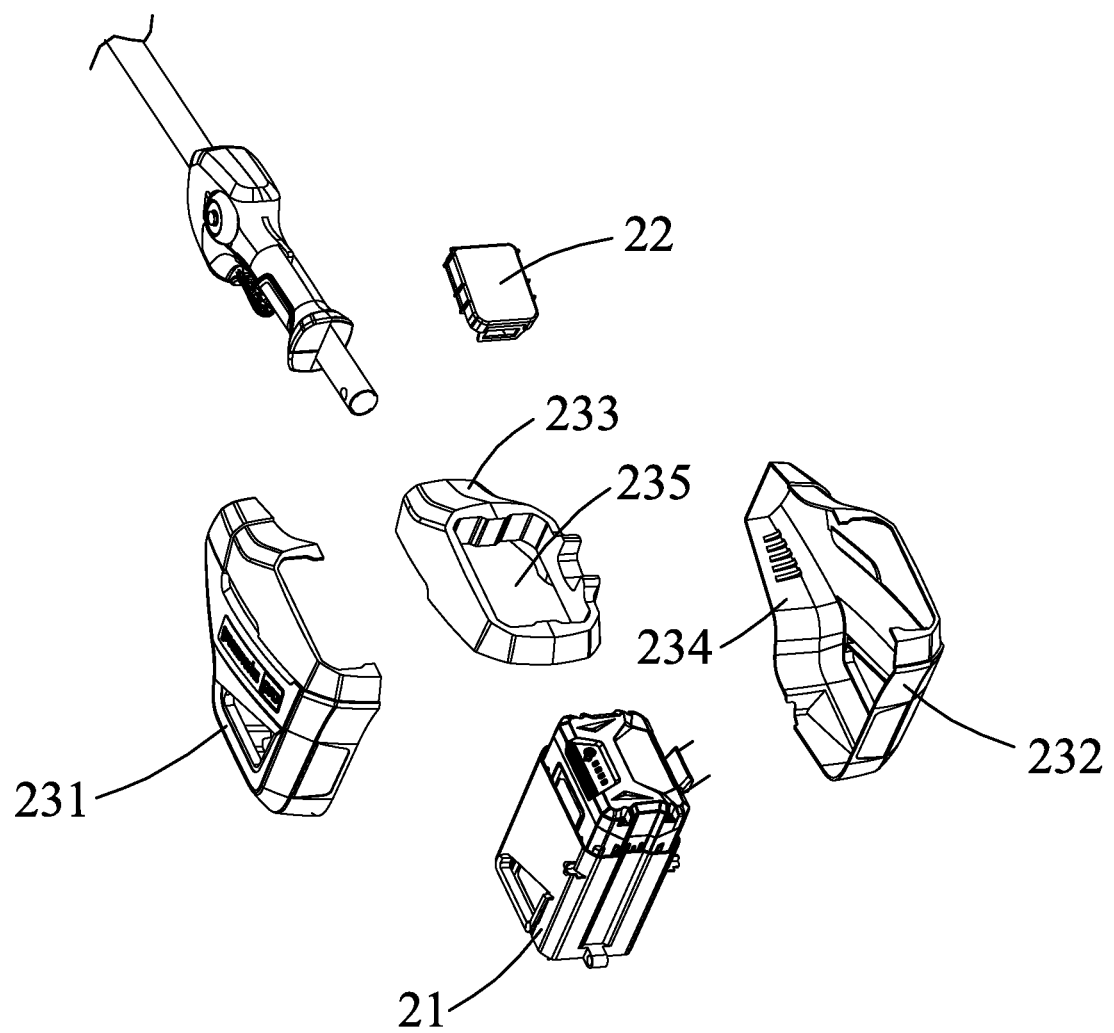
FIG. 3 is a partially exploded view of the power supplying unit shown in FIG. 2.

As shown in FIGS. 2 and 3, the power supplying unit 20 is used to supply power to the power device 50. The power supplying unit 20 includes a battery pack 21, a circuit board 22, and a fixed housing 23. The battery pack 21 is used to supply power to the motor 51, and the fixed housing 23 is used for accommodating the battery pack 21 and the circuit board 22. The battery pack 21 is detachably connected to the fixed housing 23.

The fixed housing 23 includes a left housing 231, a right housing 232 opposite to the left housing 231 and an upper housing 233 connecting to the left and right housings 231, 231. A receiving space 234 is surrounded together by the left housing 231, the right housing 232 and the upper housing 233 for accommodating the battery pack 21 and the circuit board 22. The fixed housing 23 has a mid-plane (not labeled). The fixed housing 23 is at least partially symmetrical about the mid-plane, specifically, the left housing 231 and the right housings 232 are at least partially symmetrical about the mid-plane.

The upper housing 233 is provided with a through hole 235 that penetrates the upper housing 233 along an up-to-down direction. The battery pack 21 is received in the receiving space 234 and correspondingly exposed to the through hole 235, so that the heat generated during the operation of the battery pack 21 can be dissipated through the through hole 235 and the service life of the power supplying unit 20 can be extended.

Figure 4:
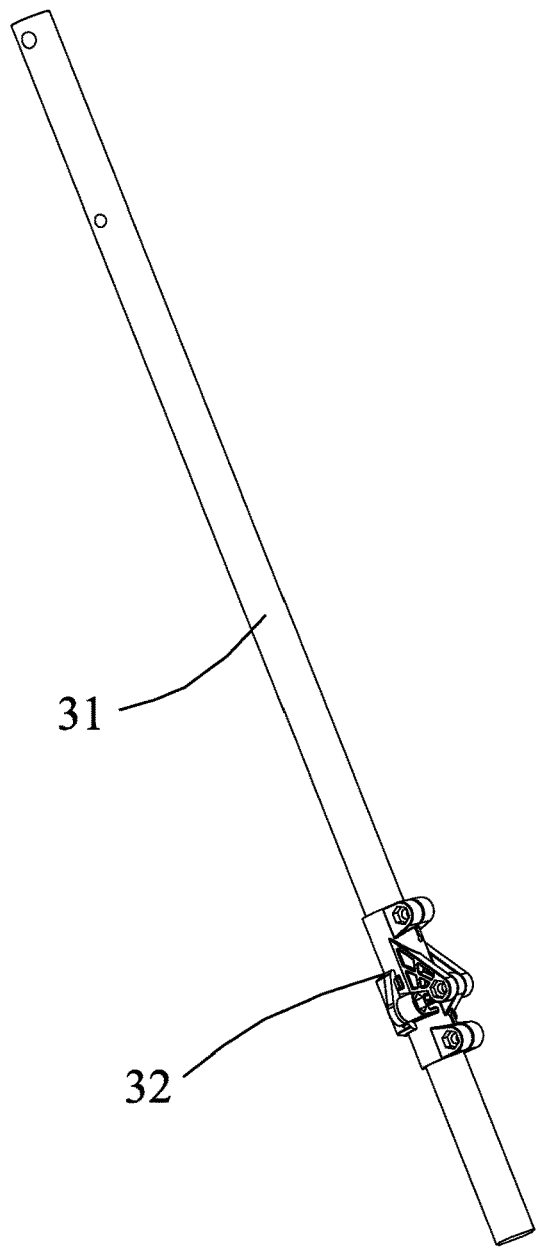
FIG. 4 is a schematic perspective view of the connecting device shown in FIG. 1.
Figure 5:
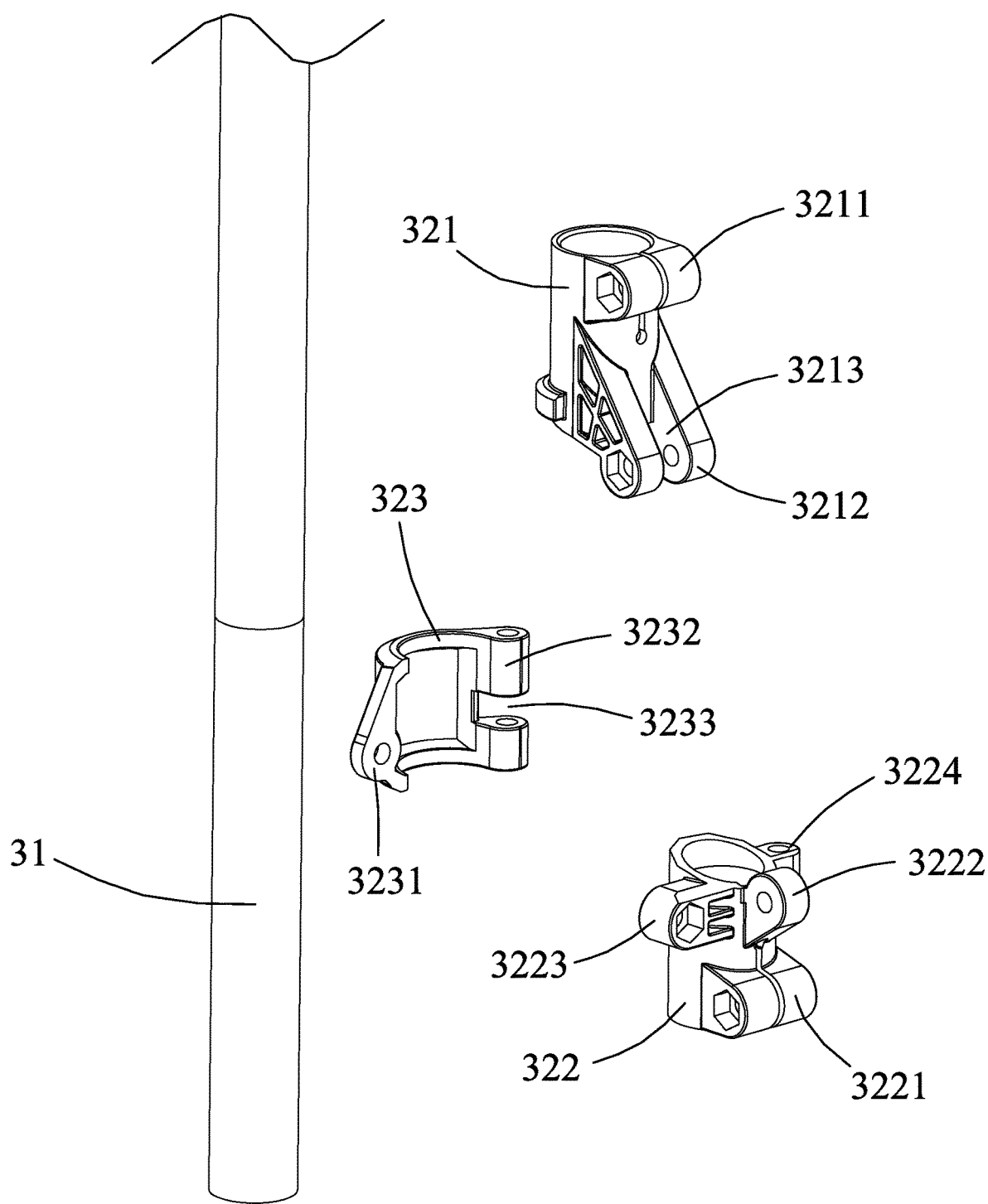
FIG. 5 is an exploded view of the connecting device shown in FIG. 4.
Figure 6:
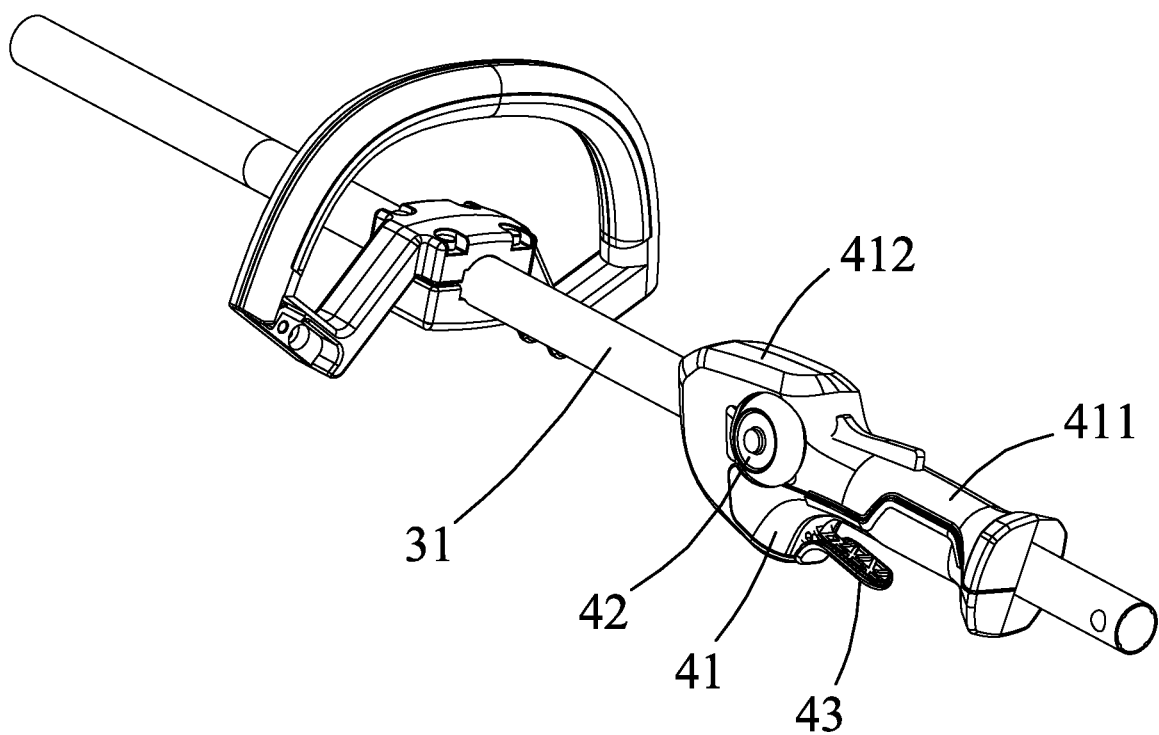
FIG. 6 is a schematic perspective view of the operating device shown in FIG. 1.
Figure 7:
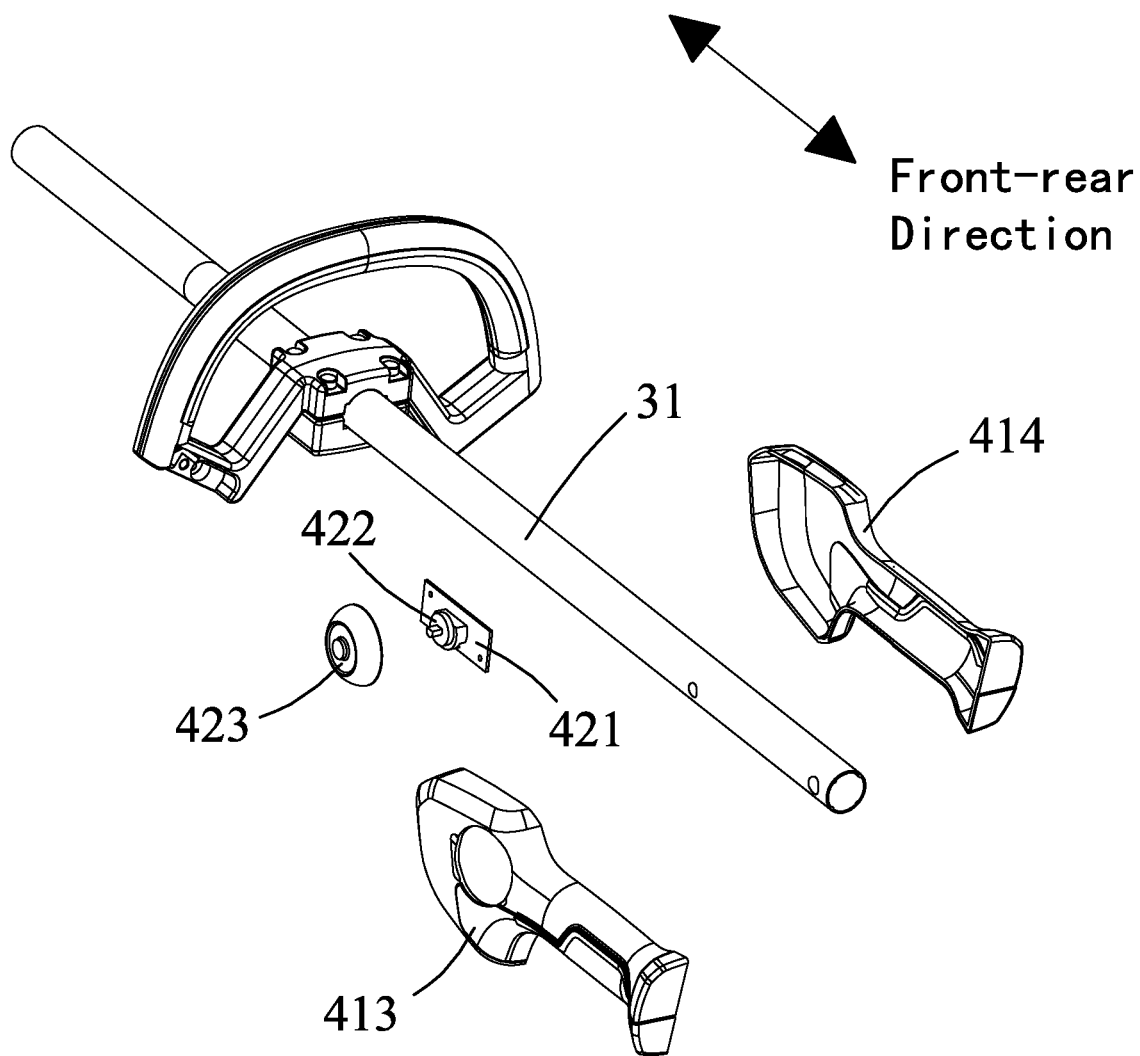
FIG. 7 is an exploded view of the operating device shown in FIG. 6, wherein the starting device being removed from the operating device.
Figure 8:
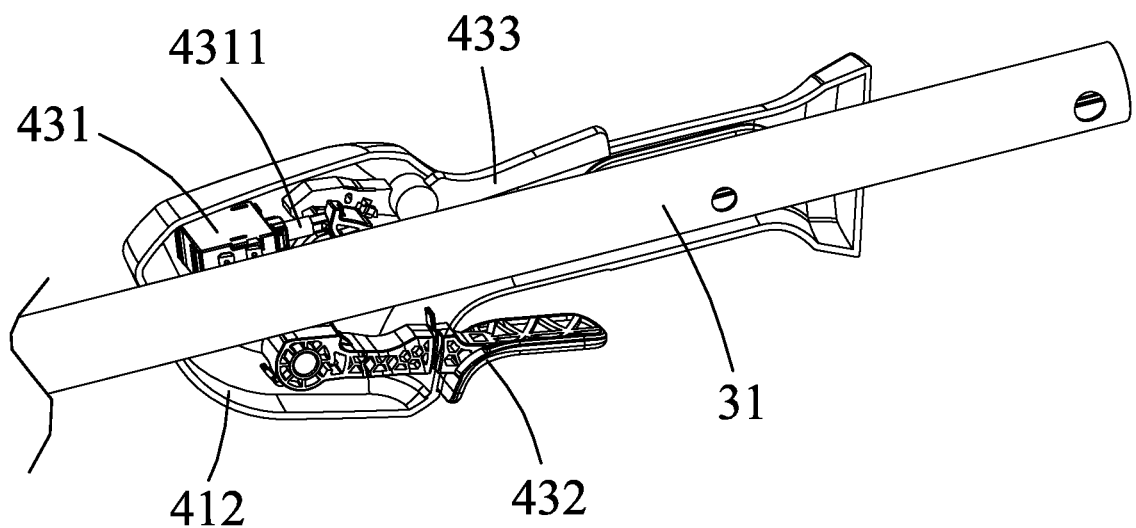
FIG. 8 is a schematic view of the operating device shown in FIG. 6, wherein the speed regulating device and the first housing being not assembled to the operating device.
Figure 9:
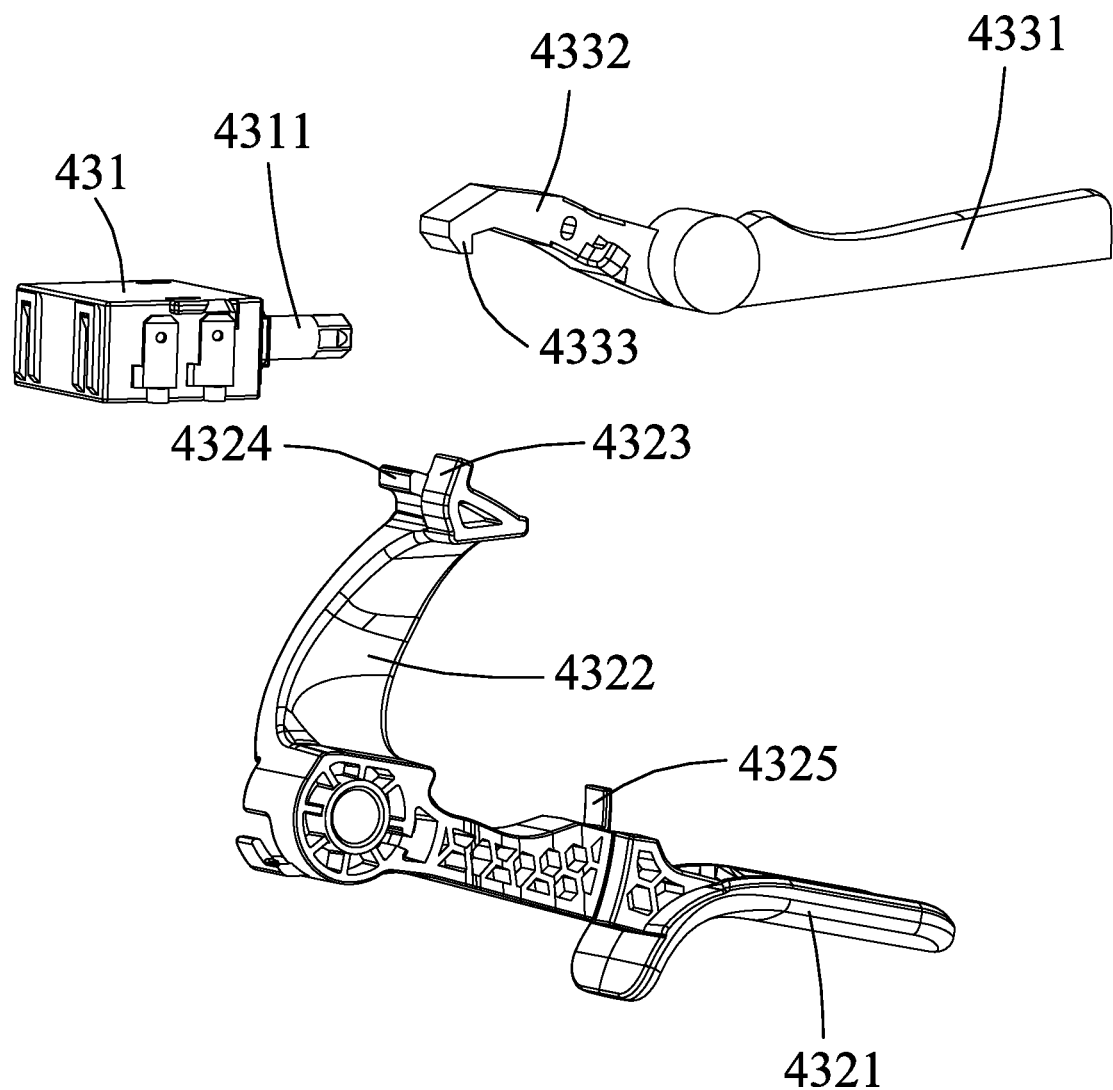
FIG. 9 is an exploded view of the starting device shown in FIG. 8.

As shown in FIGS. 4 and 5, the connecting device 30 is used to connect the working device 10 with the power supplying unit 20. The connecting device 30 comprises a connecting rod 31 and a fixing assembly 32 for fixing the connecting rod 31 to an extending rod 12 of the working device 10.

The connecting rod 31 and the extending rod 12 are both configured with a hollow-cylindrical shape, and one end of the connecting rod 31 extends into the extending rod 12. The fixing assembly 32 can be used for fixing the connection position of the connecting rod 31 and the extending rod 12 to prevent the end of the connecting rod 31 from separating with the extending rod 12.

The fixing assembly 32 includes a first fixing member 321 sleeved on the outside of the connecting rod 31, a second fixing member 322 sleeved on the outside of the extending rod 12, and a third fixing member 323 for connecting the first fixing member 321 to the second fixing member 322 through snapping. The first fixing member 321 has a first fixing portion 3211 and a second fixing portion 3212 both protruding outwardly therefrom for simultaneously fixing the connecting rod 31. The first and second fixing portions 3211, 3212 are respectively disposed at two opposite ends of the first fixing member 321. In this embodiment, two first fixing portions 3211 and two second fixing portions 3212 are provided on the first fixing member 321. A first gap 3213 is formed between the two second fixing portions 3212 for receiving the corresponding portion of the second fixing member 322. The first fixing portion 3211 and the second fixing portion 3212 are respectively provided with a screw hole (not labeled).

The second fixing member 322 is provided with a third fixing portion 3221 and a fourth fixing portion 3222 both protruding outwardly therefrom. The third fixing portion 3221 and the fourth fixing portion 3222 are respectively disposed at two opposite ends of the second fixing member 322 to simultaneously fix the extending rod 12. In this embodiment, two third fixing portions 3221 are provided on the second fixing member 322 and corresponding to two first fixing portions 3211 of the first fixing member 321. The fourth fixing portion 3222 is adjacent to the second fixing portion 3212 and received in the first gap 3213. The second fixing member 322 is further provided with a fifth fixing portion 3223 and a sixth fixing portion 3224 protruding outwardly therefrom. The fifth fixing portion 3223 and the sixth fixing portion 3224 are respectively located at two opposite sides of the fourth fixing portion 3222 to cooperate with the third fixing member 323. Preferably, each of the third fixing portion 3221, the fourth fixing portion 3222, the fifth fixing portion 3223, and the sixth fixing portion 3224 is provided with a screw hole (not labeled).

The third fixing member 323 configured with an arc-shape is disposed at an outside of the connecting position of the first fixing member 321 and the second fixing member 322. The third fixing member 323 has a seventh fixing portion 3231 and two eighth fixing portions 3232 respectively located at two opposite ends thereof. A second gap 3233 is formed between two eighth fixing portions 3232 for receiving the sixth fixing portion 3224. The seventh fixing portion 3231 engages with the fifth fixing portion 3223. Preferably, each of the seventh fixing portion 3231 and the eighth fixing portion 3232 is provided with a screw hole (not labeled).

When assembling, firstly fixing the first fixing member 321 to the connecting rod 31 through bolts (not shown) passing through the screw hole of two first fixing portion 3211 of the first fixing member 321 after sleeving the first fixing member 321 to the connecting rod 31. Secondly sleeving and fixing the second fixing member 322 to the extending rod 12 through the bolt passing through the screw holes of two third fixing portions 3221. Thirdly fixing the connecting rod 31 to the extending rod 12 after inserting the connecting rod 31 into the extending rod 12 through the bolts passing through the screw holes of the second fixing portions 3212 and the fourth fixing portion 3222 to assemble the first and second fixing members 321, 322 when the fourth fixing portion 3222 is received in the first gap 3213. Finally, assembling the third fixing member 323 to the outside of the first fixing member 321 and the second fixing member 322 through blots passing through the screw holes of the fifth and seventh fixing portions 3223, 3231, and the sixth and eighth fixing portions 3224, 3232. The seventh fixing portion 3231 is corresponding to the fifth fixing portion 3223. The sixth fixing portion 3224 is received in the second gap 3233 formed between two eighth fixing portion 3232. A stable connection between the working device 10 and the connecting device 30 is obtained through the fixing member 32.

As shown in FIG. 6 to FIG. 9, the operating device 40 is disposed between the working device 10 and the power supplying unit 20 for the user controlling the hand-held electrical power tool 100. Specifically, the operating device 40 is provided on the connecting rod 31 and located between the fixed assembly 32 and the power supplying unit 20.

The operating device 40 includes an operating housing 41, a speed regulating device 42 and a starting device 43. The operating housing 41 is formed with an operating handle 411 and a receiving portion 412. The user can grasp the operating handle 411 to operate the hand-held electrical power tool 100. Of course, the operating housing 41 may also be integrally formed with the fixed housing 23. In this case, a part of the fixed housing 23 is the operating housing 41.

In this embodiment, the operating housing 41 comprises a first housing 413 located on the left side of the connecting rod 31 and a second housing 414 located on the right side of the connecting rod 31. The operating handle 411 is formed together by the first housing 413 and the second housing 414. The receiving portion 412 is also formed by the first housing 413 and the second housing 414. The receiving portion 412 and the operating handle 411 are disposed in a forward-to-backward direction. Preferably, the operating handle 411 is disposed adjacent to the power supplying unit 20.

The speed regulating device 42 is disposed adjacently to the operating handle 411 and includes a speed regulating circuit board 421, a speed regulating switch 422 and a speed regulating operation member 423. The speed regulating circuit board 421 is fixed on the connecting rod 31, and the speed regulating switch 422 is fixed on the speed regulating circuit board 421 to control the rotation speed of the motor 51. The speed regulating operation member 423 is connected with the speed regulating switch 422 to drive the action of the speed regulating switch 422.

It should be noted that although the speed regulating circuit board 421 of the present invention is fixed on the connecting rod 31, in other embodiments, the speed regulating circuit board 421 can also be fixedly connected to the operating housing 41 (specifically, the first housing 413 or the second housing 414), thereby realizing the fixing of the speed regulating circuit board 421 and the speed regulating switch 422, which is not limited herein.

In this embodiment, the speed regulating switch 422 is a potentiometer, and the speed regulating operation member 423 is a speed regulating disc that cooperates with the potentiometer, so that when the speed regulating operation member 423 is rotated, the outputting current of the potentiometer 422 can be adjusted, and then the rotational speed of the motor 51 can be controlled to adjust the speed of the hand-held electrical power tool 100 according to the outputting current of the potentiometer 422.

It should be noted that since the potentiometer 422 is a relatively sensitive device, when the speed regulating disc 423 is rotated, the potentiometer 422 can react quickly and adjust the outputting current, no matter how small the rotation angle is, and then the rotational speed of the motor 51 can also be controlled accordingly. In this way, during actual use, the user can control the rotational speed of the motor 51 according to actual needs, and a stepless speed change of the motor 51 can be realized. When the rotational speed of the motor 51 is increased from zero to the maximum, the angle of rotation of the speed regulating disc 423 is 0-360°. Preferably, when the speed regulating disc 423 is rotated an angle of 180°, the rotational speed of the motor 51 reaches the maximum. Of course, when the rotational speed of the motor 51 reaches the maximum, the rotation angle of the speed regulating disc 423 may also be 90°, 270° or others.

In addition, the speed regulating device 42 can also be used as a device for starting the hand-held electrical power tool 100. At this time, the speed regulating operating member 423 is rotated, and the speed regulating switch 422 is actuated by the speed regulating operating member 423 to start the motor 51 and the hand-held electrical power tool 100 begins to work.

That is to say, the hand-held electrical power tool 100 of the present invention can be provided with only the speed regulating device 42 without providing the starting device 43, and the starting of the hand-held electrical power tool 100 and the stepless speed change of the motor 51 can also be achieved.

The speed regulating disc 423 configured with a circular shape has an axis intersecting with an axis of the connecting rod 31. The axis direction of the connecting rod 31 is defined as a front-to-rear direction, and the speed regulating disc 423 is located on the left side of the operating handle 411 in the front-to-rear direction. Of course, in other embodiments, the speed regulating disc 423 may also be disposed on the right side of the operating handle 411 in the front-to-rear direction, as long as it can meet the user's operating habits.

In order to enhance the frictional force of the speed regulating disc 423, a friction device (not shown) such as a pattern or a groove may also be provided on the outside wall of the speed regulating disc 423 to facilitate the user to perform the speed regulating disc 423 during work operating.

The starting device 43 includes a main control switch 431, a main control operating member 432 for activating the main control switch 431, and a safety operating member 433 disposed opposite to the main control operating member 432. The main control switch 431 is housed in the receiving portion 412 and disposed at an upper left corner of the receiving portion 412. The main control switch 431 is provided in a push-type manner and has a telescopic arm 4311, so that the motor 51 can be activated when the telescopic arm 4311 is pressed and the hand-held power tool 100 starts to work.

The main control switch 431 can also be used as another speed regulating switch. In this case, the rotation speed of the motor 51 can be adjusted according to the principle that "the larger the pressing stroke of the telescopic arm 4311, the faster the rotation speed of the motor 51", and the stepless speed change of the motor 51 can also be realized. It can be understood that the speed regulating switch 422 and the speed regulating disc 423 acts as the first speed regulating mechanism, and the main control switch 431 acts as the second speed regulating mechanism. The first speed regulating mechanism and the second speed regulating mechanism are both provided at the same time, and both of them can realize the speed regulating function without mutually influences.

One end of the main control operating member 432 is disposed adjacently to the safety operating member 433, and in the non-operating state, the main operating member 432 and the safety operating member 433 are engaged with each other to lock the main control operating member 432 and the safety operating member 433. Specifically, the safety operating member 433 and the main control operating member 432 are oppositely disposed on opposite sides of the operating handle 411. The main control operating member 432 is substantially V-shaped and includes a grip portion 4321 and a starting portion 4322. The starting portion 4322 is disposed close to the safety operating member 433, so that in the non-operating state, the starting portion 4322 and the safety operating member 433 can be engaged with each other to lock the main control operating member 432 and the safety operating member 433 to prevent the hand-held electrical power tool 100 from being suddenly started due to accidentally touched.

The starting portion 4322 is also disposed adjacently to the main control switch 431 to drive the starting portion 4322 to rotate and press the telescopic arm 4311 of the main control switch 431 to cause the main control switch 431 to be activated when the grip portion 4321 is gripped. Specifically, the end of the starting portion 4322 is provided with a first abutting portion 4323 and a second abutting portion 4324 which are disposed to intersect each other. The first abutting portion 4323 is used to activate the main control switch 431, and the second abutting portion 4324 is used to engage with the safety operating member 433.

The grip portion 4321 is provided with a limiting piece 4325 protruding toward the operating handle 411 for limiting the rotation angle of the grip portion 4321. Of course, in other embodiments, the grip portion 4321 may not be provided with the limiting piece 4325 as long as the main control switch 431 can be normally activated.

The safety operating member 433 is provided with a pressing portion 4331 and a fastening portion 4332 connected to the pressing portion 4331. The pressing portion 4331 is opposite to the grip portion 4321. The end of the fastening portion 4332 is provided with a hook 4333, and the hook 4333 is used to cooperate with the second abutting portion 4324.

It should be noted that, in the present invention, the main control switch 431, the speed regulating circuit board 421, the speed regulating switch 422, the starting portion 4322, a partial of the grip portion 4321 and the fastening portion 4332 are all housed in the receiving portion 412, and the speed regulating operating member 423 is located outside of the receiving portion 412.

Figure 10:
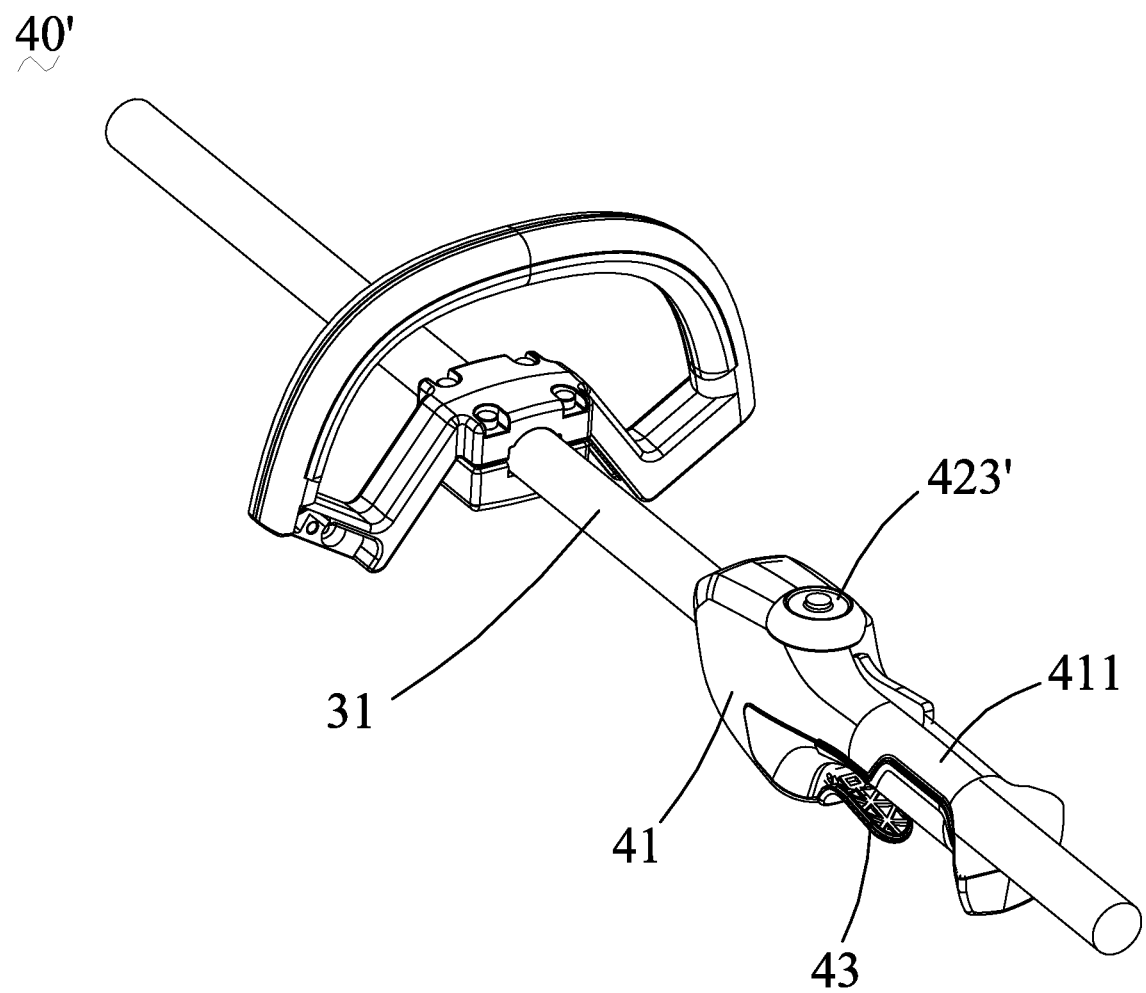
FIG. 10 is a schematic perspective view of another embodiment of the operating device shown in FIG. 6.

As shown in FIG. 10, it is a perspective view of another embodiment of the operating device 40. In the present embodiment, the structure of the operating device 40' is basically the same as that of the operating device 40 shown in FIG. 6. The only difference is that the axis direction of the connecting rod 31 is defined as a front-to-rear direction, and the speed regulating operating member (i.e., the speed regulating disc) 423' is located directly above the operating handle 411 in the front-to-rear direction. Of course, in other embodiments, the speed regulating operating member 423' may also be located directly below the operating handle 411 in the front-to-rear direction, or at any other position, as long as the same effect can be achieved, which is not limited here.

The speed regulating operating member 423' is disposed directly above the operating handle 411, facilitating the operator to operate with the left or right hand according to personal habits, and making the operation being more convenient.

When the hand-held electrical power tool 100 of the present invention is used, firstly the pressing portion 4331 is pressed, the fastening portion 4332 is lifted upwardly, and the hook 4333 is released from the second abutting portion 4324. Then the grip portion 4321 is griped in a direction toward and close to the operating handle 411 to move the first abutting portion 4323 toward the main control switch 431 and press the telescopic arm 4311, so that the main control switch 431 is activated, the motor 51 is rotated, and the entire hand-held electrical power tool 100 is started. Then, the speed regulating disc 423 is rotated to adjust the outputting current of the potentiometer 422. At this time, the rotation speed of the motor 51 changes according to the outputting current of the potentiometer 422, and the stepless speed change of the motor 51 is truly realized.

In summary, on the one hand, the hand-held electrical power tool 100 of the present invention has the speed regulating device 42 located adjacently to the operating handle 411, thereby facilitating the operator to operate according to the habit, and the operation is more convenient. On the other hand, the speed regulating switch 422 is fixed on the speed regulating circuit board 421 and the connecting rod 31, and the speed regulating operating member 423 is arranged to adjust the rotating speed of the motor 51 in a rotating manner. The axis of the speed regulating operating member 423 intersects with that of the connecting rod 31, so that when the speed regulating operation member 423 is rotated, the speed regulating switch 422 can be operated, and a stepless speed change of the motor 51 can be realized, which facilitates the cutting requirements of different grasses and obtains a convenient operation.

The above embodiments are only used to illustrate the technical solutions of the present invention and are not limited thereto. Although the present invention is described in detail with reference to the preferred embodiments, those skilled in the art should understand that the technical solutions of the present invention may be modified or equivalently substituted without departing from the spirit and scope of the technical solutions of the present invention.

The invention claimed is:

1. A hand-held power tool, which comprises:
a working device for performing a working function of the hand-held power tool;
a power device including a motor for driving the working device;
a power supplying unit for powering the power device;

an operating device for a user operating the power tool, the operating device including:

an operating handle for gripping by the user;

a starting device for selectively activating the motor on and off while the motor is being powered by the power supplying unit; and a speed regulating device adjacently arranged to the operating handle;

wherein the speed regulating device comprises a speed regulating switch and a speed regulating operating member connected with the speed regulating switch to drive the speed regulating switch to operate, the speed of the motor increases from 0 to maximum when the speed regulating operating member rotates a preset angle.

2. The hand-held electrical power tool according to claim 1, wherein the speed regulating switch is a potentiometer, and the speed regulating operating member is a speed regulating disc cooperating with the potentiometer, and an outputting current of the potentiometer is adjusted when the speed regulating disc is rotated.

3. The hand-held electrical power tool according to claim 2, wherein the speed regulating device further comprises a speed regulating circuit board, and the potentiometer and the motor are respectively connected to the speed regulating circuit board to control the speed of the motor according to the outputting current of the potentiometer.

4. The hand-held electrical power tool according to claim 1, wherein the hand-held electrical power tool further comprises a connecting device connecting the working device and the power supplying unit, and wherein the connecting device comprises a connecting rod, and an axis of the speed regulating operating member intersects with an axis of the connecting rod.

5. The hand-held electrical power tool according to claim 4, wherein the axial direction of the connecting rod is defined as a front-to-rear direction, and the speed regulating operating member is located at the left side of the operating handle in the front-to-rear direction.

6. The hand-held electrical power tool according to claim 4, wherein the axial direction of the connecting rod is defined as a front-to-rear direction, and the speed regulating operating member is located directly above or below the operating handle in a front-to-rear direction.

7. The hand-held electrical power tool according to claim 1, wherein the speed regulating operating member further drives the speed regulating switch to activate the power device and the working device.

8. The hand-held electrical power tool according to claim 1, wherein the starting device comprises a main control switch, a main control operating member for starting the main control switch and a safety operating member located opposite to the main control operating member, and wherein one end of the main control operating member is disposed adjacently to the safety operating member, and the main control operating member and the safety operating member are engaged with each other in the non-operating state.

9. The hand-held electrical power tool according to claim 8, wherein the safety operating member and the main control operating member are oppositely disposed on opposite sides of the operating handle, and the maincontrol operating member is substantially V-shaped, the main operating member includes a grip portion and a starting portion, the starting portion is disposed adjacently to the main control switch to drive the starting portion to rotate and press the main control switch when the grip portion is gripped.

10. The hand-held electrical power tool according to claim 8, wherein the main control switch is provided in a push-type manner and provided with a telescopic arm to activate the motor when the telescopic arm is pressed, and the larger the pressing stroke of the telescopic arm is, the faster the motor rotates.

* * * * *